United States Patent [19]

Faugeras et al.

[11] 4,055,625

[45] Oct. 25, 1977

[54] METHOD OF TREATMENT OF A MIXTURE OF AIR AND AT LEAST PARTIALLY RADIOACTIVE RARE GASES

[75] Inventors: Pierre Faugeras, Versailles; Pierre Lecoq, La Queue-en-Brie; Pierre Miquel, Chatillon; Hubert Rouyer, Antony; Guy Simonet, Paris, all of France

[73] Assignee: Commissariat a l'Energie Atomique, Paris, France

[21] Appl. No.: 592,949

[22] Filed: July 3, 1975

[30] Foreign Application Priority Data

July 31, 1974 France .................................. 74.26520
Apr. 17, 1975 France .................................. 75.11965

[51] Int. Cl.² ........................................... C01B 23/00
[52] U.S. Cl. ....................................... 423/262; 62/22; 176/37; 252/301.1 W; 423/210; 423/219; 423/235; 423/245
[58] Field of Search ........ 423/262, 210, 219, 235–245; 62/22; 252/301.1 W; 176/37

[56] References Cited

U.S. PATENT DOCUMENTS

| 2,962,868 | 12/1960 | Dennis | 423/262 |
|---|---|---|---|
| 3,173,778 | 3/1965 | Goumer | 423/262 |
| 3,181,306 | 5/1965 | Geist et al. | 423/262 |
| 3,222,879 | 12/1965 | Stoklosinski | 62/22 |
| 3,596,471 | 8/1971 | Streich | 423/219 |
| 3,748,864 | 7/1973 | Lofredo et al. | 252/301.1 W |
| 3,751,934 | 8/1973 | Frischbein | 62/22 |
| 3,944,646 | 3/1976 | Martin | 423/262 |
| B 428,386 | 3/1976 | Kamiya et al. | 252/301.1 W |

*Primary Examiner*—Herbert T. Carter
*Attorney, Agent, or Firm*—Flynn & Frishauf

[57] ABSTRACT

The method of treatment of a mixture of air and at least partially radioactive gases such as xenon and krypton in particular, especially gaseous effluents derived from the reprocessing of irradiated nuclear fuels, comprises a stage of concentration of the rare gases in solution in liquid oxygen by cryogenic distillation of the light gases and especially nitrogen from the liquefied mixture.

5 Claims, 5 Drawing Figures

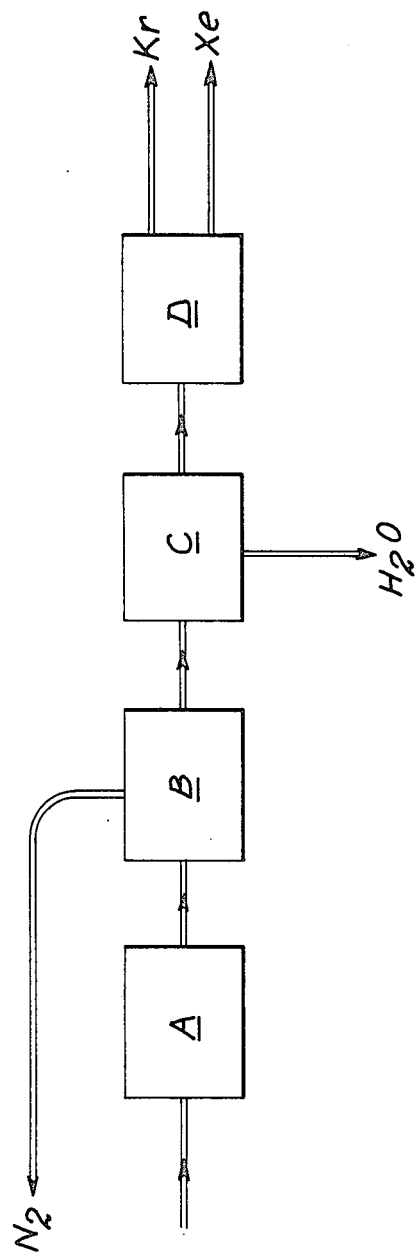

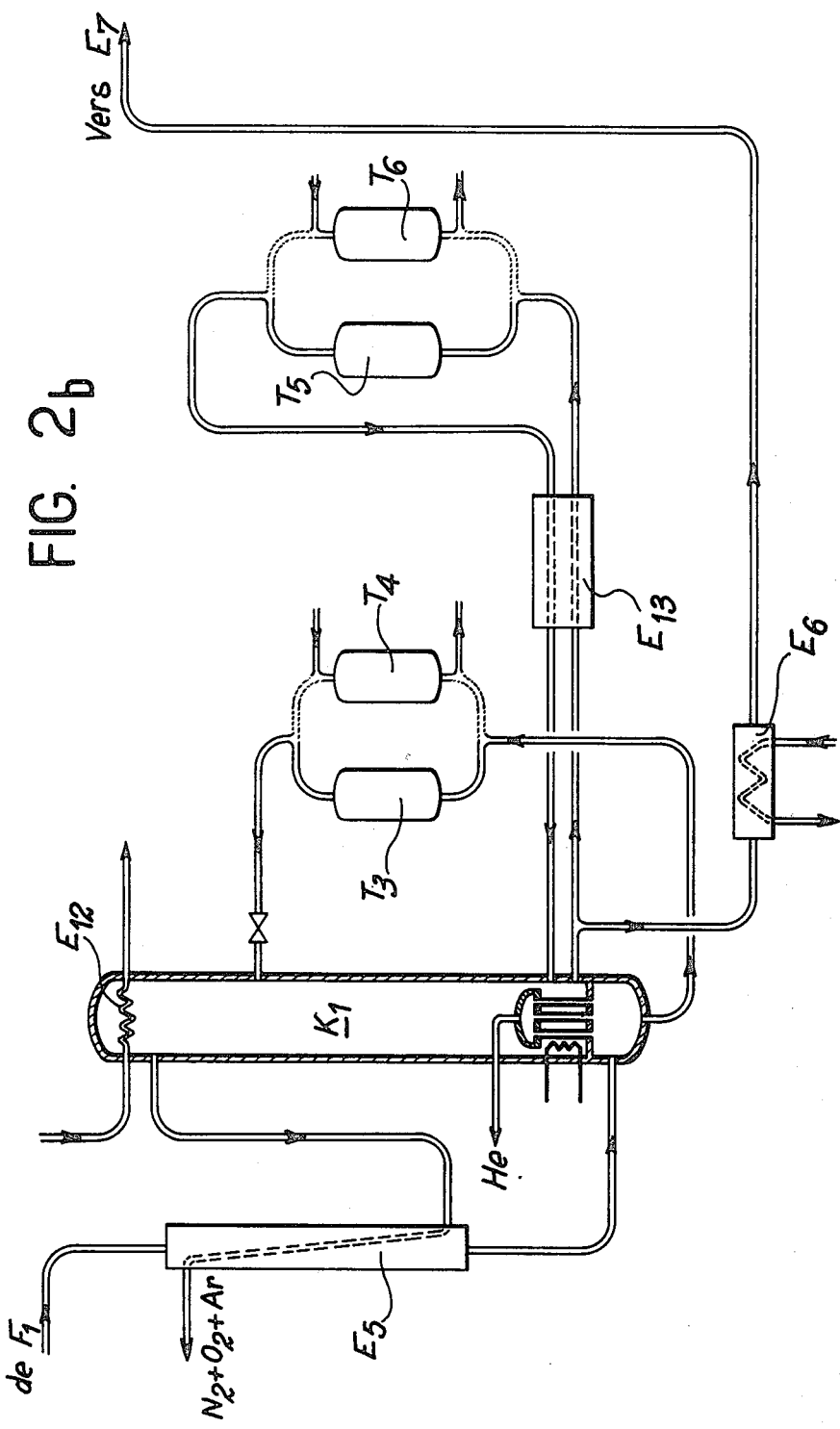

METHOD OF TREATMENT OF A MIXTURE OF AIR AND AT LEAST PARTIALLY RADIOACTIVE RARE GASES

This invention relates to the treatments to which mixtures of air and rare gases are subjected and more particularly the gaseous effluents derived from reprocessing of irradiated nuclear fuels, a further object of such treatments being to recover the xenon contained in these mixtures.

The gaseous effluents which are produced by irradiated fuel reprocessing plants and to which the invention is more particularly applicable are essentially constituted by air containing at least rare gases such as xenon and krypton and usually water vapor, carbon dioxide gas and also nitrogen oxides, the presence of which is due to the dissolution of the fuels in a nitric acid medium.

It is already a known practice to treat these gaseous effluents by methods which essentially comprise a purification step resulting in the production of a mixture of air and rare gases which does not contain any other impurities, this step being followed by removal of all the oxygen contained in the mixture prior to concentration of the remaining nitrogen in xenon and krypton by cryogenic distillation. The greater part of the nitrogen is thus recovered and can be recycled in the fuel reprocessing plant.

The concentrated mixture of xenon and krypton in nitrogen is then subjected to a further cryongenic distillation for separating the krypton and nitrogen from the xenon. Cryogenic distillation is understood to mean in each case that the mixture considered is brought to the liquefied state no later than at the level of a boiler provided at the bottom of a column in which the distillation takes place.

The xenon which can finally be produced by these methods is free from any radioactive character and well-suited to all the usual industrial uses of this rare gas whereas the period of decay of radioactive krypton is much too long to make its presence acceptable.

In the known methods, the separation of xenon and krypton takes place in liquid nitrogen and the same applies to the concentration of the mixture of these latter. However, the presence of liquid nitrogen is attended by major disadvantages which have prohibited the use of these methods in practice. One of the difficulties encountered has arisen in particular from repeated clogging of distillation columns as a result of crystallization of xenon since this latter does not readily dissolve in liquid nitrogen.

The present invention is directed to a method which makes it possible to overcome the disadvantages of methods which have been known up to the present time, this being achieved by replacing the nitrogen or a nitrogen-oxygen mixture by oxygen in the process of concentration by distillation. In fact, contrarily to what could normally be expected in the present state of knowledge concerning the formation of ozone in a radioactive medium, it has been found that the presence of oxygen does not give rise to any insurmountable danger despite the residence times which are necessary in distillation operations.

The invention is thus primarily concerned with a method of treatment of a mixture of air and rare gases including xenon and krypton in particular which are at least partially radioactive and especially gaseous effluents derived from the reprocessing of irradiated fuels. The invention essentially comprises a stage of concentration of the rare gases in solution in liquid oxygen by cryogenic distillation of the light gases and especially nitrogen from the liquefied mixture. These distillates can be processed with a view to recovering the nitrogen and recycling this latter on the shearing machine which serves to cut the fuels in the reprocessing plant.

After said concentration stage, the method preferably comprises in addition a stage of separation of the rare gases by catalytic combustion of oxygen with hydrogen and removal of the water which is formed followed by a stage of recovery of xenon by cryogenic distillation of the other rare gas or gases.

The invention is also concerned with a method of treatment of effluent gases derived from the reprocessing of irradiated nuclear fuels constituted by a gaseous mixture containing at least xenon and krypton which is radioactive in air. The method essentially comprises in succession a first stage of purification of the gaseous mixture with a view to removing any impurities such as the nitrogen oxides, carbon dioxide gas, water vapor, and more particularly the hydrocarbons, a second stage of concentration of the xenon and the krypton of the gaseous mixture, said concentration being carried out in solution in liquid oxygen by distillation of the light gases and mainly nitrogen from the liquefied mixture, a third stage of separation of the xenon and the krypton by catalytic combustion of the oxygen of the mixture previously obtained with hydrogen and removal of the water which is formed, and a fourth stage of recovery of the xenon by cryogenic distillation of the mixture of xenon and krypton.

The catalytic combustion of oxygen which preferably forms part of the method according to the invention can take place in the presence of an excess quantity of hydrogen. One of the advantages of this combustion lies in the fact that it facilitates the final stage of xenon recovery. In fact, the distillation of the xenon-krypton mixture takes place in the absence of oxygen. Although at least the greater part is preferably eliminated, especially by trapping of the krypton and the xenon by cold production, the hydrogen which remains in the mixture distils more readily with krypton than would be the case if oxygen were employed or even more readily than is the case with the use of nitrogen in conventional methods. Moreover, the fact that the xenon-krypton-hydrogen mixture has a reducing action is advantageous in one preferred mode of execution of the method in which said mixture is subjected to a complementary catalytic treatment for removing any traces of nitrogen oxides.

In an alternative embodiment of the invention, the catalytic combustion of oxygen takes place in the presence of a slight excess quantity of hydrogen in a gas mixture which mainly contains krypton and xenon derived from recycling of the gases at the end of processing.

The method in accordance with this alternative embodiment permits dilution of the oxygen in the mixture which circulates within the reactor and this dilution limits the heat build-up of said reactor.

The problem of heat build-up in a reactor is of primary importance: if the dilution of oxygen circulating within the reactor is not carried out, there is a considerable temperature rise due to the exothermic reaction of hydrogen with oxygen to form water. In one practical example, the temperature rise due to the exothermic reaction of combustion of hydrogen in oxygen is approximately 160° per one volume percent of oxygen in the case of combustion in hydrogen and would attain 220° C per one volume percent of oxygen in the case of combustion in a krypton-xenon mixture.

Thus the object of this alternative embodiment is to provide a loop system for the recirculation of gases discharged from the reactor with a view on the one hand to operating with a slight excess quantity of hydrogen only at the reactor outlet and on the other hand with a view to strongly diluting the oxygen which passes through said reactor with inert gases, namely krypton and xenon; the non-recycled fraction of gases obtained at the reactor outlet is continuously returned after removal of water into a cryogenic distillation column in order to ensure separation and recovery of the xenon in said column.

As already mentioned, the stage of concentration by distillation of the light gases and mainly nitrogen can take place in liquid oxygen in accordance with the invention, in spite of the radioactive medium. It is even a remarkable fact that the presence of a large quantity of oxygen, as is likely to be the case if the preliminary operations provided in known processes for the removal of oxygen are completely suppressed, offers the advantage of promoting efficient operation at the level of the concentration by ensuring enhanced solubilization of the xenon and the krypton and facilitating complete removal of nitrogen, which also proves beneficial in the final stage of xenon recovery.

It can prove an advantage, however, to prevent accumulation of the formed ozone by means of a preferred mode of execution of the method according to the invention whereby a fraction of the mixture which has become liquefied during concentration is withdrawn preferably in continuous operation and passed into a trap for dissociation of the ozone which may be present in said fraction before returning this latter into the liquefied mixture.

Moreover, it is preferable to subject the mixture of air and rare gases to purification prior to the concentration stage with a view in particular to removing any hydrocarbons which may be present. This purification process can also be more complete and make it possible in particular to remove the nitrogen oxides, the carbon dioxide gas and the water vapor as in the methods of the prior art for the treatment of gaseous effluents derived from reprocessing of nuclear fuels.

It will clearly be understood that the invention also extends to the suitable installations for carrying out the method. Installations of this type comprise in particular catalytic reactors and cryogenic distillation columns together with all their known ancillary equipments which are connected by means of pipes for the circulation of the different products and so arranged as to permit the successive operations of the method defined in the foregoing.

The characteristic features of an installation of this type as well as the features of the method will become more clearly apparent from a perusal of the following description which relates to a particular example of application of the invention although it will be understood that this example is not given in any limiting sense.

In the description given hereinafter, reference is made to the accompanying drawings in which:

FIG. 1 illustrates diagrammatically the sequence of operations involved in the method described;

FIGS. 2a, 2b and 2c are schematic diagrams which show the installation employed and the circulation of the products between the different stages;

In the particular case described, the method according to the invention is applied to the treatment of gaseous effluents derived from a nuclear fuel reprocessing plant. More particularly, the treated effluent comes partly from a workshop for cutting irradiated fuel elements and partly from a workshop for the dissolution of the fuel in nitric acid. However, the method applies more generally to the recovery of xenon in a gas mixture.

The effluent is supplied to the installation as shown diagrammatically in FIG. 1 from a workshop in which the iodine which may be present therein is adsorbed and removed. Said effluent is then made up of air (97 to 99 volume %) containing nitrogen protoxide $N_2O$ (1 to 3%), traces of $CO_2$, $NO_3H$, $NO$, $NO_2$, water vapor at saturation, xenon (550 volumes per million approximately) and krypton (50 volumes per million approximately), this latter being partly in the form of radioactive Kr 85.

The installation mainly comprises four successive treatment units which make it possible respectively to carry out the four following stages of operation, in this order:

1. At A, the purification stage which consists in freeing the treated effluent from the impurities contained therein and especially hydrocarbons so as to obtain a mixture consisting of air which practically no longer contains xenon and krypton.
2. At B, the concentration stage which mainly consists of cryogenic distillation of the purified mixture, this distillation being carried out so as to remove practically the entire quantity of nitrogen contained in the mixture as well as the greater part of the oxygen and to collect a concentrated mixture of xenon and krypton in oxygen.
3. At C, a stage involving separation of xenon and krypton from the oxygen starting from the concentrated mixture by catalytic combustion of the oxygen in the presence of hydrogen and removal of the water which is formed.
4. At D, the separated mixture of xenon, krypton and hydrogen is subjected to a second cryogenic distillation operation so as to remove the krypton and hydrogen and to collect pure xenon.

Figure 2A:
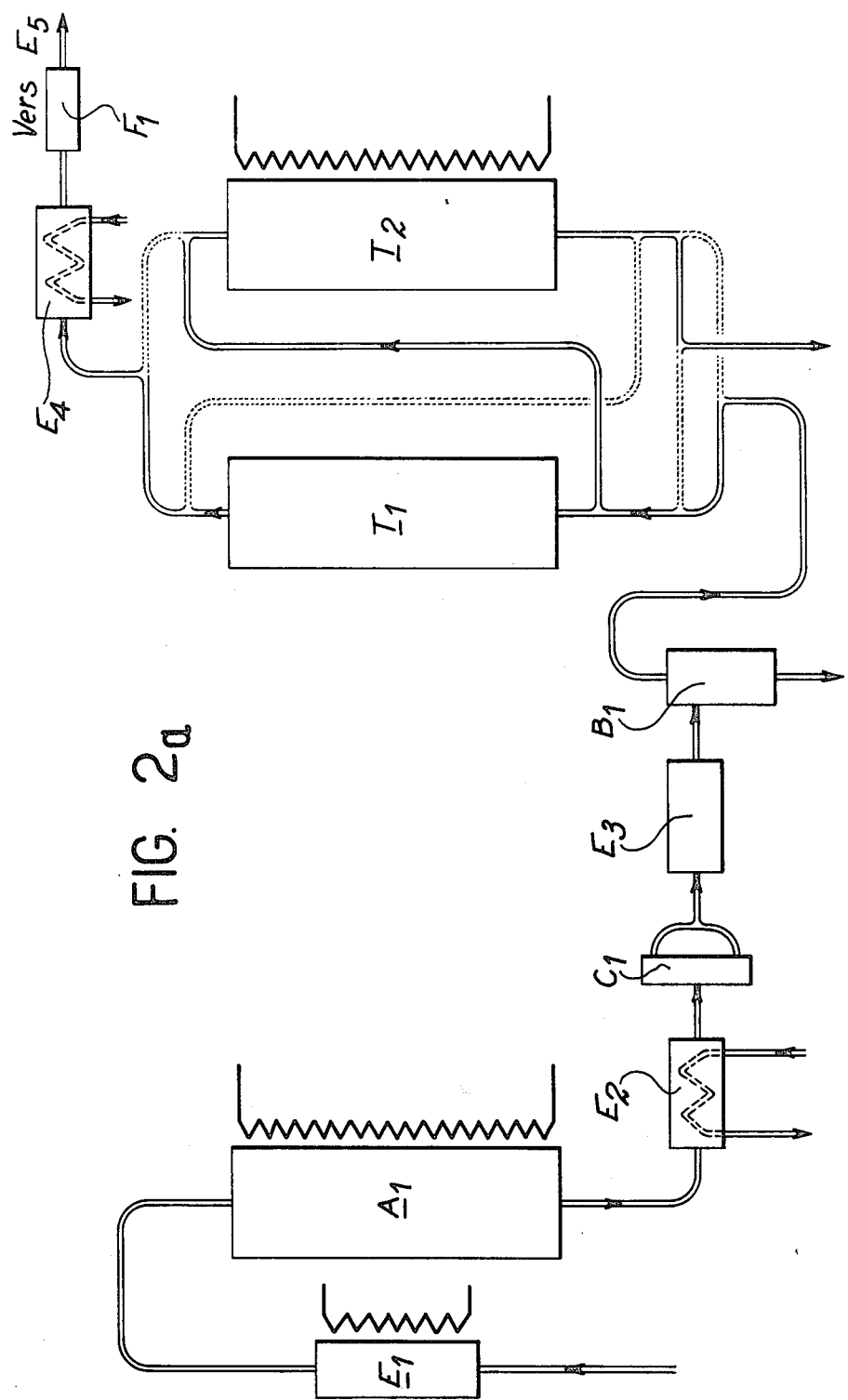

The installation and the method will now be described in greater detail with reference to FIGS. 2a, 2b, 2c.

At the inlet of the purification unit, the treated gaseous effluent passes into scrubbing towers (not shown) comprising a sodium hydroxide scrubbing tower in which the effluent is freed from $CO_2$, $NO$ and $NO_2$, followed by a water scrubbing tower in which the entrained sodium hydroxide and ammonia are removed. These two towers operate at atmospheric pressure and at normal temperature.

The effluent then passes through the heater $E_1$ in which its temperature is increased to approximately 500° C, then into the reaction vessel $A_1$ in which a catalyst (platinum, for example) decomposes the hydrocarbons to form $CO_2$ and $H_2O$ whilst another catalyst (rhodium, for example) decomposes the nitrogen protoxide $N_2O$ to $N_2$ and $O_2$. An external heating device ensures that the temperature is correctly maintained within the reaction vessel. At the exit of said vessel, the proportion of hydrocarbons and $N_2O$ contained in the gaseous mixture does not exceed 1 volume per million.

Said mixture is cooled by exchange with water within the cooling unit $E_2$, then compressed to approximately 8 atm. abs. within the compressor $C_1$. The mixture is again cooled within the unit $E_3$ in which a certain condensation of water takes place. The water is collected in the separator $B_1$ and removed.

The compressed mixture obtained is dried by passing through a molecular sieve within one of the two adsorbers $T_1$ and $T_2$ which are placed in parallel. Traces of $CO_2$ are also retained in this adsorption. These two adsorbers are subjected periodically and alternately to regeneration by heating and circulating a fraction of the treated gas mixture which can then be recycled to the inlet of the purification unit.

At the exit of the operating adsorber, the cooler $E_4$ reduces the temperature of the treated gas mixture to a value of the order of 20° C and the filter $F_1$ retains the sieve particles which may have been entrained.

The mixture which has just been purified is admitted into the concentration unit in which it passes first into the heat exchanger $E_5$ and is cooled to a temperature in the vicinity of the dew-point before being admitted into the bottom of the distillation column $K_1$.

The distillation column operates at a pressure of approximately 1.5 atm. abs.

The lower portion of the column $K_1$ is constituted by a boiler in which the liquefaction of the gas mixture provides the greater part of the heating which is necessary for the operation of the column. An electric device for auxiliary heating is installed within the boiler itself. A purge at the top of the vaporizer permits periodic discharge of non-liquefiable gases, namely helium in particular. The pressure within the boiler is 8 atm. abs.

The liquefied mixture is withdrawn from the bottom of the column and passed into the central portion of the column via one of two alumina filters $T_3$ and $T_4$ which are periodically subjected both to alternate operation and to regeneration and remove the final traces of any hydrocarbons which may be present.

At the head of the column, a reflux is ensured by a condenser $E_{12}$ which is cooled by liquid nitrogen.

The column $K_1$ ensures the removal of part of the oxygen and the entire quantity of nitrogen which can be purified and recycled to the head of the plant. The column also carries out the concentration of the krypton and xenon in solution in liquid oxygen. There is withdrawn from the top of the column a decontaminated mixture which contains oxygen and argon in addition to nitrogen. This mixture is heated within the heat exchanger $E_5$ in counterflow to the mixture which is fed into the column. There is withdrawn from the boiler of the column a concentrated mixture of krypton and xenon in oxygen and this latter passes into a heat exchanger $E_6$ which ensures vaporization and reheating of the mixture.

The column $K_1$ can also be coupled if necessary to ozone traps $T_5$ and $T_6$. Connections are provided at the level of the boiler of the column for continuously withdrawing a fraction of the concentrated liquefied mixture, for passing said mixture into a heat exchanger $E_{13}$, then into either of the two elements which effects the dissociation of the ozone and operates periodically in alternate sequence, for then returning the mixture to the bottom of the column through the countercurrent exchanger $E_{13}$.

The concentrated mixture of krypton and xenon in oxygen which is obtained at the outlet of the concentration unit is diluted in a hydrogen loop, the flow rate being such as to obtain an oxygen content which is lower than 2% within the reaction vessel $A_2$. The mixture is then reheated within the heater $E_7$ to a temperature of the order of 100° C.

The gas mixture is then introduced into a reaction vessel $A_2$ in which there takes place a catalytic combustion of oxygen with hydrogen on a palladium catalyst, for example of the "Deoxo" type. Another catalyst bed (rhodium, for example) can also be incorporated in the reaction vessel $A_2$ in order to remove any traces of nitrogen oxides NO and $NO_2$. After exiting from the reaction vessel $A_2$, the gas mixture passes into the cooler $E_8$ in which it is cooled and the condensed water is removed at $B_2$.

Removal of the oxygen having thus been ensured, the gas mixture which is withdrawn at the exit of a fan $C_3$ is made up of xenon and krypton, hydrogen and water vapor. A three-way valve 100 is placed on the exit side of the fan $C_3$. That portion which is not recycled through the pipe 101 then passes into either of two assemblies which operate periodically in alternate sequence and each comprise a heat exchanger $E_9$ or $E_{10}$ in which the water vapor is removed by low-temperature deposition, followed by a freezer $F_2$ or $F_3$ in which the xenon and the krypton are retained at a temperature of approximately −180° C. The heat exchangers $E_9$ and $E_{10}$ are cooled by the cold nitrogen which is withdrawn at the nitrogen outlet of the condenser at the head of the column $K_1$ whilst the freezers $F_2$ and $F_3$ are cooled by circulation of liquid nitrogen.

Recovery of the krypton-xenon mixture is carried out alternately from one of the freezers $F_2$ and $F_3$ which is isolated from the circuit $C_3$ by heating said freezer. This heating causes sublimation of the xenon and krypton deposit. The water which is trapped in the heat exchanger $E_9$ or $E_{10}$ is heated and removed at the same time.

The krypton-xenon-hydrogen gas mixture is transferred into the xenon recovery unit. Said mixture is admitted under a pressure of 4 atm. abs. approximately into the central portion of a column $K_2$ in which distillation of the krypton takes place. In the bottom portion of the column, a condenser cooled by an argon bath which is in turn cooled by a circulation of liquid nitrogen within the heat exchanger $E_{14}$ ensures column reflux. Heating of the boiler is carried out by means of a heater $E_{15}$.

The partly radioactive distilled krypton which may still contain hydrogen is withdrawn at the head of the column $K_2$. Marketable xenon in the pure state is withdrawn from the bottom end of the column and heated in a heat exchanger $E_{11}$. The xenon is available at the outlet of the installation at 4 atm. abs. and at room temperature.

Figure 2C:
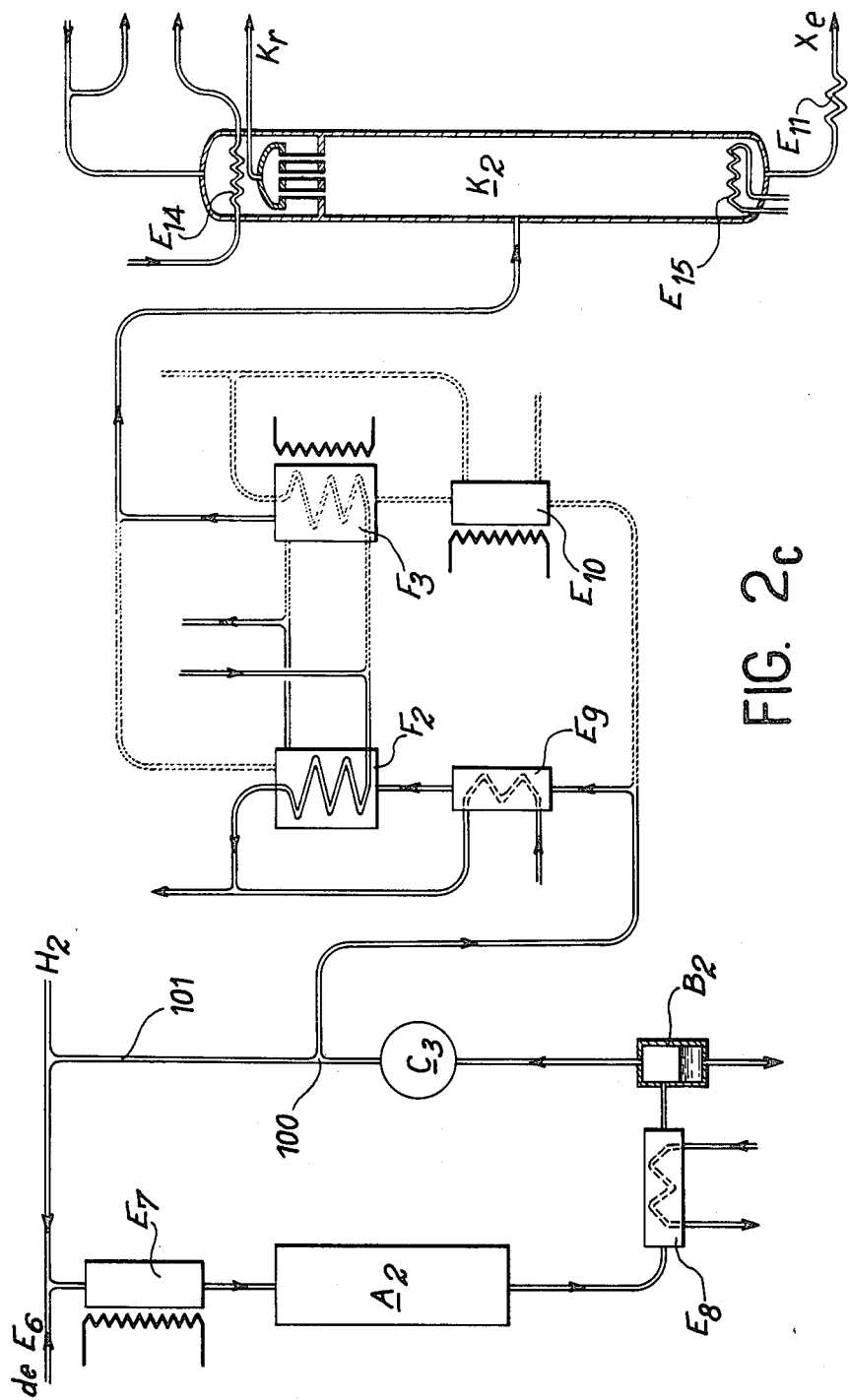
Figure 3:
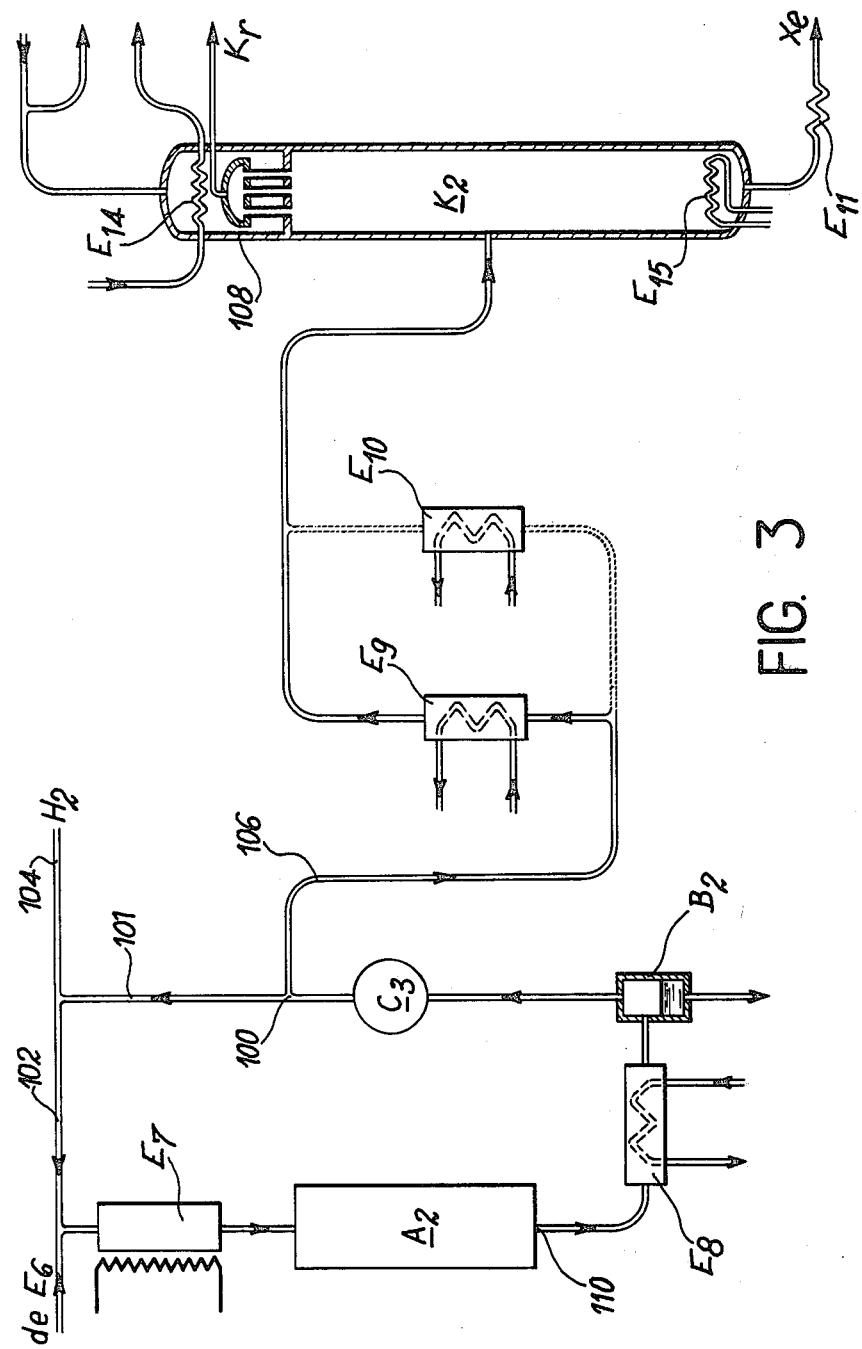
FIG. 3 shows an alternative embodiment of the invention which is concerned with the catalytic combustion of oxygen.

The structure which is illustrated in FIG. 3 constitutes an alternative embodiment of the device shown in FIG. 2c and described earlier. The device shown on the upstream side of this single figure is the same as the device which is employed in the installation of FIG. 2c and shown in FIGS. 2a and 2b.

The device illustrated in FIG. 3 is essentially concerned with the reaction vessel which is employed for removing oxygen from the mixture derived from the prior equipment, that is to say the distillation column employed for obtaining the oxygen-krypton-xenon mixture. Said mixture (approximately 90% oxygen) is admitted via the heat exchanger $E_6$ which is shown in FIG. 2b. The device comprises a heater-exchanger $E_7$, a catalytic combustion reactor $A_2$, a heat exchanger $E_8$, a vessel $B_2$ in which the water is collected, a fan $C_3$, a branch pipe 100 which directs part of the exit gases from the reaction vessel $A_2$ to the pipe 102 which is connected to a hydrogen supply by means of the line 104, the other part of the exit gases being directed via the line 106 to the distillation column $K_2$ through one of the two heat exchangers $E_9$ and $E_{10}$.

The concentrated mixture of krypton and xenon in oxygen which is obtained at the exit of the concentration unit shown in FIG. 2b is diluted within the krypton and xenon loop circuit constituted by the pipe 102, the heat exchanger $E_7$, the reaction vessel $A_2$, the heat exchanger $E_8$, the vessel $B_2$, the fan $C_3$ and the pipe 101.

The flow rate of krypton and of xenon is such that the oxygen content within the reaction vessel $A_2$ is lower than 2%. The hydrogen is injected via the line 104 in order to maintain a slight excess quantity of this gas at the exit 110 of the reaction vessel $A_2$ (in contrast to FIG. 2c in which the flow rate of injected hydrogen resulted in a considerable excess quantity of hydrogen).

The mixture derived from the heat exchanger $E_6$ after addition of the mixture consisting mainly of krypton and xenon supplied through the pipe 102 is heated to 100° C within the heat exchanger $E_7$, then introduced into the reaction vessel $A_2$ in which is carried out the catalytic reaction of oxygen with hydrogen on a catalyst of known type designated as "Deoxo"; another type of catalyst can also be incorporated in the reaction vessel $A_2$ in order to remove any possible traces of nitrogen oxides NO and $NO_2$.

At the exit of the reaction vessel $A_2$, the gas mixture passes into the cooler $E_8$ and is cooled within this latter.

The condensed water is removed within the vessel $B_2$.

After removal of the oxygen, the gas mixture withdrawn from the exit of the fan $C_3$ and consisting of xenon, krypton, a small quantity of hydrogen and a small quantity of water vapor, is directed partly through the pipe 101 into the pipe 102 and partly through the pipe 106 into one of the heat exchangers $E_9$ or $E_{10}$. These two heat exchangers $E_9$ and $E_{10}$ are connected in parallel in order to permit the alternate use of either one heat exchanger or the other whilst the exchanger which is not in use can be regenerated.

Within said heat exchangers $E_9$ and $E_{10}$ which are cooled with liquid nitrogen, the remaining water vapor is removed by low-temperature deposition. The gas mixture of krypton, xenon and hydrogen is then transferred into the cryogenic distillation column $K_2$ in which xenon recovery takes place. The gas mixture is admitted into the central portion of the column $K_2$ under a pressure of approximately 4 atmospheres.

At the top portion of the column $K_2$, a condenser 108 cooled by an argon bath which is in turn cooled by a circulation of liquid nitrogen within the heat exchanger $E_{14}$ ensures column reflux. Heating of the boiler is carried out by means of the heater $E_{15}$.

The distilled krypton is withdrawn at the head of the column $K_2$.

Marketable xenon in the pure state is withdrawn from the bottom of the column $K_2$ and reheated in a heater $E_{11}$. The xenon is available at the exit of the installation at four atmospheres and at room temperature.

In comparison with FIG. 2c, it is apparent that the device of FIG. 3 permits a more simple installation and enhanced safety. In fact, the hydrogen which has constituted the main carrier gas in the reaction vessel $A_2$ is replaced by krypton and xenon which are inert gases.

Moreover, the loop-system recirculation of krypton and xenon within the reaction vessel $A_2$ reduces heat build-up within the reaction vessel $A_2$ and dilutes the oxygen which is introduced.

Finally, in accordance with the invention, the rate of feed of the final column $K_2$ is uniform since the operation can be wholly continuous.

What we claim is:

1. A method for treating radioactive effluent gases obtained from reprocessing of irradiated nuclear fuels containing xenon, and krypton which is radioactive in air by treating a mixture thereof also containing oxygen, nitrogen oxides, gaseous carbon dioxide, water vapor, argon and hydrocarbons comprising
   i. removing nitrogen oxides, gaseous carbon dioxide, water vapor and hydrocarbons contained in said effluent gas mixture therefrom, thereafter
   ii. liquifying the oxygen in said effluent gas mixture and distilling off gaseous nitrogen oxides a portion of the oxygen, and argon contained therein in a cyrogenic distillation column thereby forming a concentrated liquified mixture in the lower portion thereof, said concentrated liquified mixture also containing ozone formed from oxygen in the radioactive medium,
      withdrawing a fraction of said ozone-containing liquified mixture from said distillation column and dissociating said ozone in said liquified mixture and then returning said liquified mixture to said distillation column, and removing a liquified mixture of oxygen containing xenon and krypton from the lower portion of said distillation column, then
   iii. adding hydrogen to said oxygen containing xenon and krypton and catalytically combining said oxygen with said hydrogen to form water and removing said water, to form an admixture of xenon and krypton, and
   iv. cryogenically distilling said admixture of xenon and krypton to distill the krypton as a gas from liquid xenon and recovering said xenon.

2. A method according to claim 1, wherein the catalytic combining of oxygen with hydrogen takes place in the presence of an excess quantity of hydrogen.

3. A method according to claim 2, wherein the greater part of the excess hydrogen remaining after said catalytic combination of hydrogen and oxygen to form water is removed in a cold trap.

4. A method according to claim 1, wherein the catalytic hydrogen/oxygen combination to form water is carried out within a reaction vessel having an inlet and an outlet in the presence of a slight excess quantity of hydrogen in a mixture consisting mainly of inert gases, and wherein the outlet gases from said reaction vessel essentially consisting of krypton, xenon and a small proportion of hydrogen, are partially and continuously recycled to the inlet of said reactor.

5. A method according to claim 4, wherein the non-recycled fraction of the gases obtained at the outlet of said reactor is directed continuously after removal of water into a cryogenic distillation column for the separation and recovery of the xenon.

* * * * *